United States Patent
Su et al.

(10) Patent No.: US 11,153,120 B2
(45) Date of Patent: Oct. 19, 2021

(54) GATEWAY CONTROLLING CHIP AND NETWORK PACKET PROCESSING METHOD

(71) Applicant: REALTEK SEMICONDUCTOR CORPORATION, Hsinchu (TW)

(72) Inventors: Tsung-Yin Su, Hsinchu (TW); Chen-He Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/818,607

(22) Filed: Mar. 13, 2020

(65) Prior Publication Data
US 2021/0144027 A1   May 13, 2021

(30) Foreign Application Priority Data
Nov. 8, 2019   (TW) .................. 108140639

(51) Int. Cl.
| | | |
|---|---|---|
| H04L 12/46 | (2006.01) | |
| H04L 12/721 | (2013.01) | |
| H04W 80/04 | (2009.01) | |
| H04W 88/16 | (2009.01) | |
| H04L 12/66 | (2006.01) | |
| H04W 76/12 | (2018.01) | |

(52) U.S. Cl.
CPC .......... *H04L 12/4633* (2013.01); *H04L 12/66* (2013.01); *H04L 45/66* (2013.01); *H04W 76/12* (2018.02); *H04W 80/04* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2012/0087356 A1 | 4/2012 | Wentink | |
| 2015/0180755 A1 | 6/2015 | Zhang et al. | |
| 2016/0142226 A1* | 5/2016 | Huang | ................ H04L 12/4633 370/392 |
| 2017/0041136 A1 | 2/2017 | Niemczyk et al. | |
| 2018/0262599 A1 | 9/2018 | Firestone | |
| 2019/0013967 A1* | 1/2019 | Ishii | .................... H04L 63/0892 |

FOREIGN PATENT DOCUMENTS

TW    201002010    1/2010

OTHER PUBLICATIONS

English abstract translation of TW201002010.

* cited by examiner

*Primary Examiner* — Huy D Vu
*Assistant Examiner* — Hong Shao
(74) *Attorney, Agent, or Firm* — WPAT, P.C.; Anthony King

(57) ABSTRACT

The present disclosure provides a gateway controlling chip and a network packet processing method thereof. The gateway controlling chip is configured to: retrieve a network packet; determine that the network packet is an upstream IP tunneling network packet; determine a packet type of the upstream IP tunneling network packet; retrieve a packet operation list corresponding to the packet type, wherein the packet operation list records a plurality of packet operations; and perform the packet operations for processing the network packet.

16 Claims, 24 Drawing Sheets

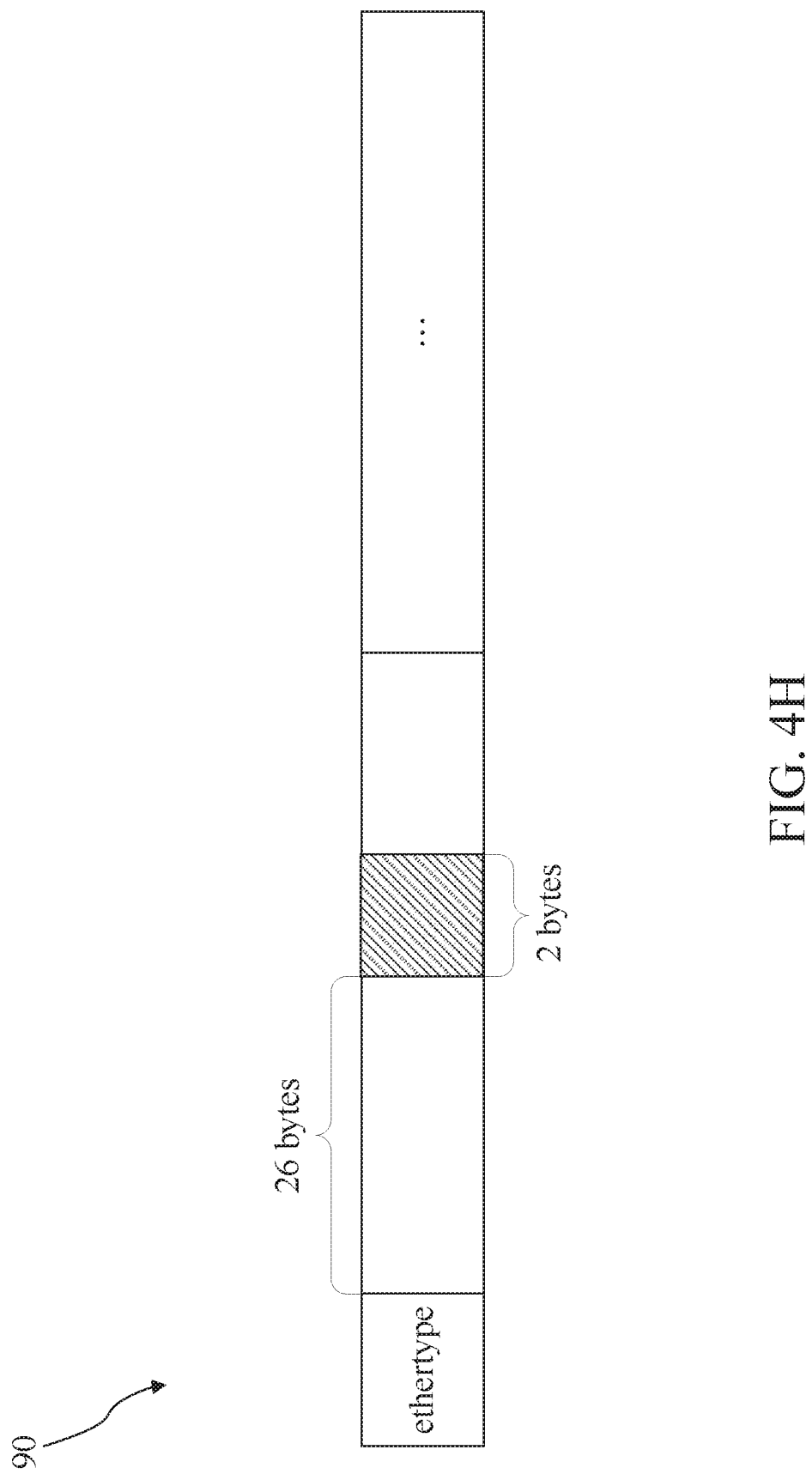

GATEWAY CONTROLLING CHIP AND NETWORK PACKET PROCESSING METHOD

CROSS REFERENCE TO RELATED APPLICATIONS

This application claims priority of Taiwan application No. 108140639 filed on Nov. 8, 2019, which is incorporated by reference in its entirety.

BACKGROUND

Field of the Invention

The present disclosure relates generally to a network device controlling chip and network packet processing method thereof, more particularly, to a gateway controlling chip and network packet processing method thereof.

Description of Related Art

According to the prior network technology, IP tunneling allows the communication between the user end and the server end through a specific channel, and during the data transfer of said channel, the original network packet has to be packaged additionally. However, in the current IP tunneling technology, said additional packaging of the original network packet is carried out by the software, and hence, the processing speed of the network packet is limited by the software.

BRIEF SUMMARY OF THE INVENTION

Some embodiments of the present disclosure provide a network packet processing method for use in a gateway controlling chip, including: retrieving a network packet; determining that the network packet is an uplink IP tunnel network packet; determining a packet type of the uplink IP tunnel network packet; retrieving a packet operation list corresponding to the packet type, wherein the packet operation list records a plurality of packet operations; and performing the plurality of packet operations to process the network packet.

Some embodiments of the present disclosure provide a gateway controlling chip, including: a processing unit and a storage unit. The storage unit is configured to store a program, wherein the program, upon execution, causes the processing unit to: retrieve a network packet; determine that the network packet is an uplink IP tunnel network packet; determine a packet type of the uplink IP tunnel network packet; retrieve a packet operation list corresponding to the packet type, wherein the packet operation list records a plurality of packet operations; and perform the plurality of packet operations to process the network packet.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A to 4H are schematic views of processing the network packet according to some embodiments of the present disclosure.

DETAILED DESCRIPTION

Figure 1:
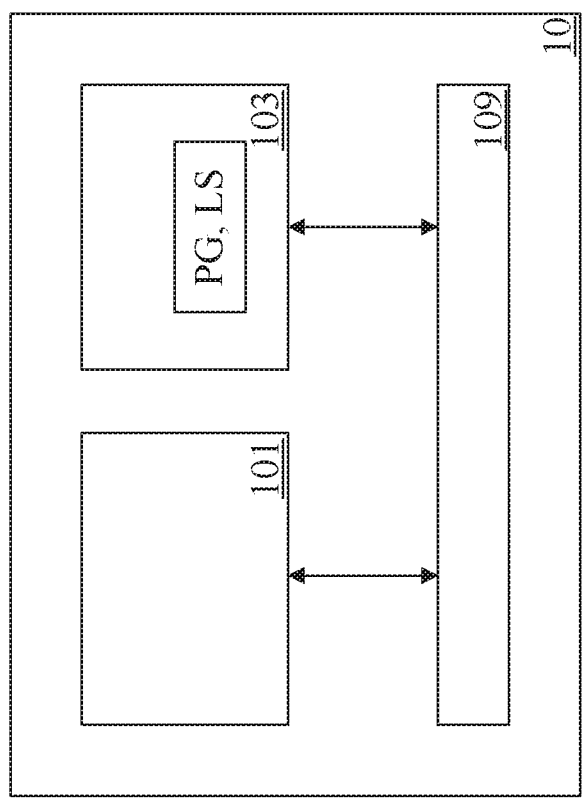
FIG. 1 is a block diagram illustrating a gateway controlling chip according to some embodiments of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

With respect to the additional packaging of the network packet for IP tunneling, the present invention provides a gateway controlling chip 10. In this way, via the allocation of additional hardware the package processing procedure may be speeded up. Please refer to FIG. 1, which is a block diagram illustrating a gateway controlling chip 10 according to some embodiments of the present invention. The gateway controlling chip 10 includes a processing unit 101 and a storage unit 103. The processing unit 101 and storage unit 103 are electrically coupled by a bus 109. Via the bus 109, the processing unit 101 may execute a program PG stored in the storage unit 103. The execution of the program PG causes the processing unit 101 to perform functions related to the network packet processing. The relevant network packet processing functions are discussed further hereinafter.

Figure 2:
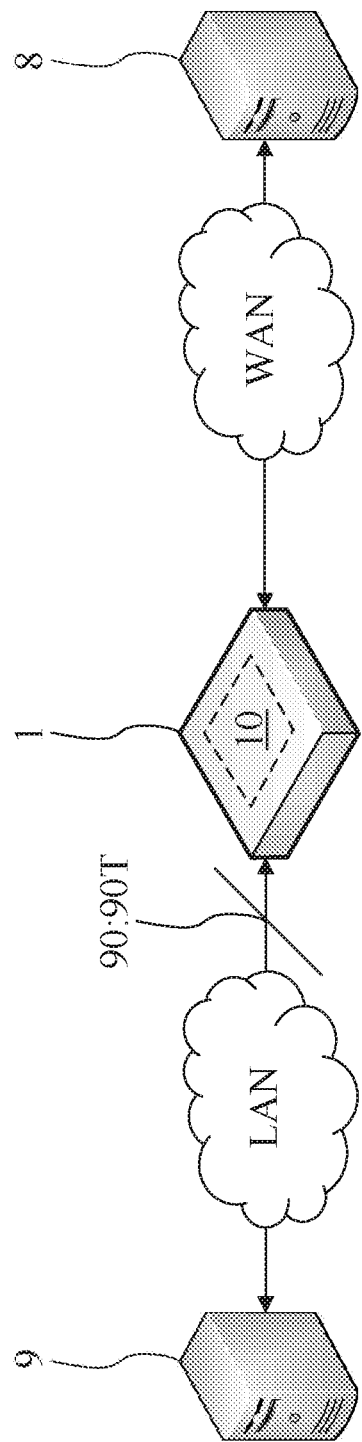
FIG. 2 is a schematic diagram illustrating the operation of the gateway controlling chip according to some embodiments of the present invention.

Please refer to FIG. 2 together. FIG. 2 is a schematic diagram illustrating the operation of the gateway controlling chip 10 of the present invention. As shown in the figures, the gateway controlling chip 10 is disposed on a gateway 1 and is configured to process network packets forwarded to the gateway 1. In particular, the gateway 1 is connected to a client end 9 and a server end 8 via a local area network LAN and a wide area network WAN respectively. When the program PG of the gateway chip 10 is executed, the processing unit 101 is configured to retrieve a network packet 90 from the local area network LAN or wide area network WAN.

In some embodiments, when the processing unit 101 determines that the network packet 90 is an uplink IP tunnel network packet that the client end 9 transmits to the server end 8, the gateway controlling chip 10, before transmitting the network packet 90, may process the network packet 90 further. Since different types of uplink IP tunnel network packets may have different packet contents, different types of uplink IP tunnel network packets may correspond to different packet processing operation steps. Accordingly, after determining that the network packet 90 is an uplink IP tunnel network packet, the processing unit 101 of the gateway controlling chip 10 may then determine a packet type 90T of the uplink IP tunnel network packet.

Next, after determining the packet type 90T of the uplink IP tunnel network packet, the processing unit 101 retrieves a packet operation list LS, which corresponds to the packet type 90T, in the storage unit 103 with respect to the packet type 90T. The packet operation list LS records a plurality of packet operations which are configured to process the network packet of the packet type 90T. Accordingly, the processing unit 101 performs the packet operation(s) recorded in the packet operation list LS, so as to further process the network packet 90, and then transmits the network packet 90 to the server end 8 via a transmission interface of the gateway 1.

In some embodiments, the packet type 90T may includes a Point to Point Tunneling Protocol (PPTP) type, a Layer 2 Tunneling Protocol (L2TP) type or a DS-Lite (DS-Lite) type. With respect to different types, a plurality of packet operations may include: insert outer layer header operation, change packet Ethertype operation, the packet length update operation, Generic Routing Encapsulation (GRE) data or IP identification (IP ID) update operation, Layer 3 (L3) check code update operation, Layer 4 (L4) check code update operation, or a combination thereof. The packet operations corresponding to each of the PPTP type, L2TP type and DS-Lite type is further discussed hereinbelow.

In some embodiments, when the packet type 90T is determined as the PPTP type, the network packet 90 needs the following operations for being further processed: insert outer layer header operation, change packet Ethertype operation, the packet length update operation, GRE data or IP ID update operation, and L3 check code update operation. The above-mentioned operations may be recorded in the packet operation list LS in every possible combination.

More specifically, when the packet type 90T of the network packet 90 is the PPTP type, the processing unit 101 retrieves the packet operation list LS, and performs the packet operations recorded in the packet operation list LS in the order of: (1) insert outer layer header operation; (2) change packet Ethertype operation; (3) packet length update operation; (4) GRE data or IP ID update operation; (5) L3 check code update operation; (6) packet length update operation; and (7) GRE data or IP ID update operation. In other words, the processing unit 101, after retrieving the packet operation list LS, sequentially performs the packet operations (1) to (7) as recorded, so as to further process the network packet 90.

In some embodiments, the packet operation list LS records a plurality of operation parameters corresponding to the above-mentioned packet operations, and the processing unit 101 sequentially performs the above-mentioned packet operations (1) to (7) according to the plurality of operation parameters, so as to further process the network packet 90. FIG. 3A to FIG. 3G and accompanying examples are provided hereinbelow to illustrate the process of the above-mentioned packet operations (1) to (7) in connection with the operation parameters in more detail.

For example, based on the PPTP protocol, in addition to the content of the original network packet 90, some PPTP type network packets further include an IP v4 header with a length of 20 bytes, a GRE header with a length of 16 bytes, and a Point to Point Protocol (PPP) header with a length of 4 bytes, and hence, an outer layer header with a length of 40 bytes (including the IP v4 header, GRE header and PPP header) should be additionally inserted into the network packet 90.

Figure 3A:
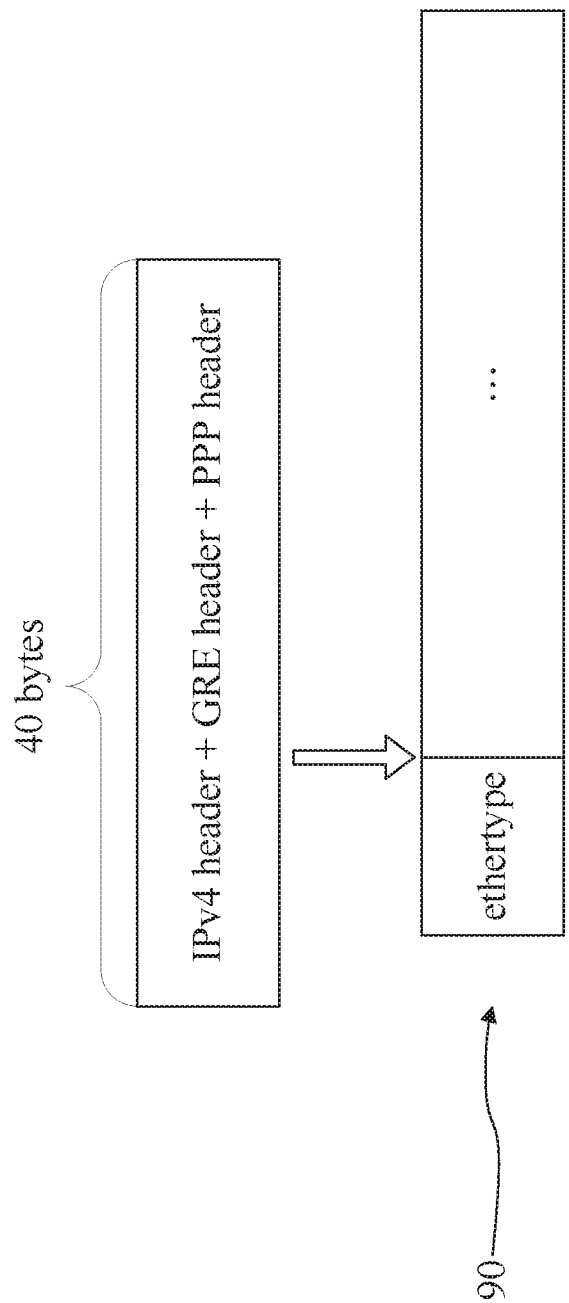
FIGS. 3A to 3G are schematic views of processing the network packet according to some embodiments of the present disclosure.
Figure 3B:
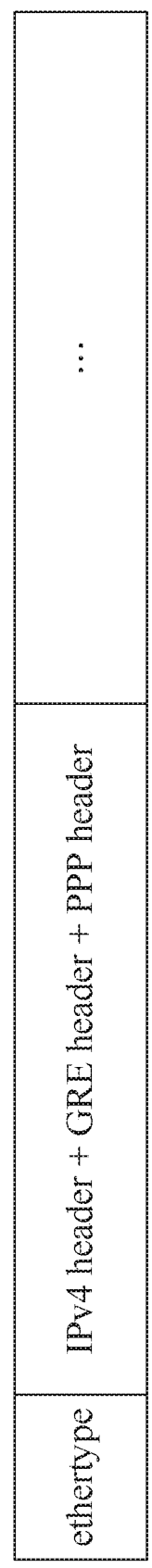

Accordingly, please refer to FIGS. 3A and 3B, when the processing unit 101 performs operation (1) "insert outer layer header operation", the corresponding initial address operation parameter is the address after the Ethertype field of the original network packet 90, and the length operation parameter is 40 (unit: byte). In other words, according to the above-mentioned two operation parameters, when the operation (1) "insert outer layer header operation" is being carried out, the processing unit 101 inserts an outer layer header having a length of 40 bytes after the Ethertype field originally recorded in the network packet 90. Then, the processing unit 101 carries out the operation (2) "change packet Ethertype operation", in which the Ethertype field originally recorded in the network packet 90 is changed to 0x0800 (i.e., IP v4 Ethertype).

Figure 3C:
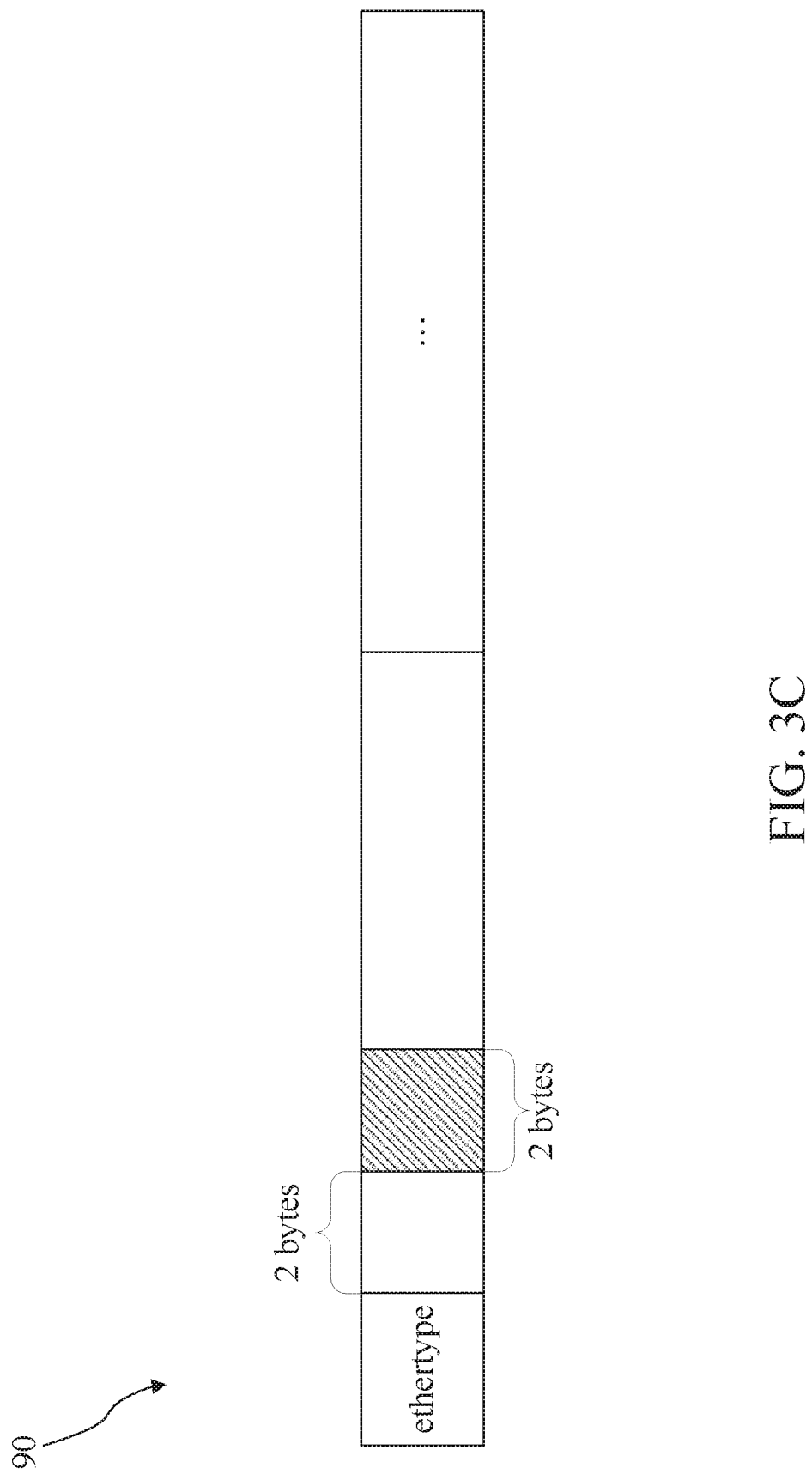

Next, please refer to FIG. 3C, when the processing unit 101 performs operation (3) "packet length update operation", the corresponding initial address operation parameter is the address after 2 (unit: byte) shifted from the outer layer header, and the length of the operation parameter is 2 (unit: byte). Moreover, this operation further includes a corresponding additional operation parameter 0 (representing the addition operand) and additional value parameter of 40. In other words, according to the above-mentioned four operation parameters, when the operation (3) "packet length update operation" is being carried out, the processing unit 101 updates 2 bytes data from the address after 2 bytes shifted from the outer layer header (i.e., the shaded portion of the network packet 90 in FIG. 3C). The update involves primarily in adding a value of 40 to the value of the original data. It should be noted that in FIG. 3C, the shaded portion in the network packet 90 is the total length field.

Figure 3D:
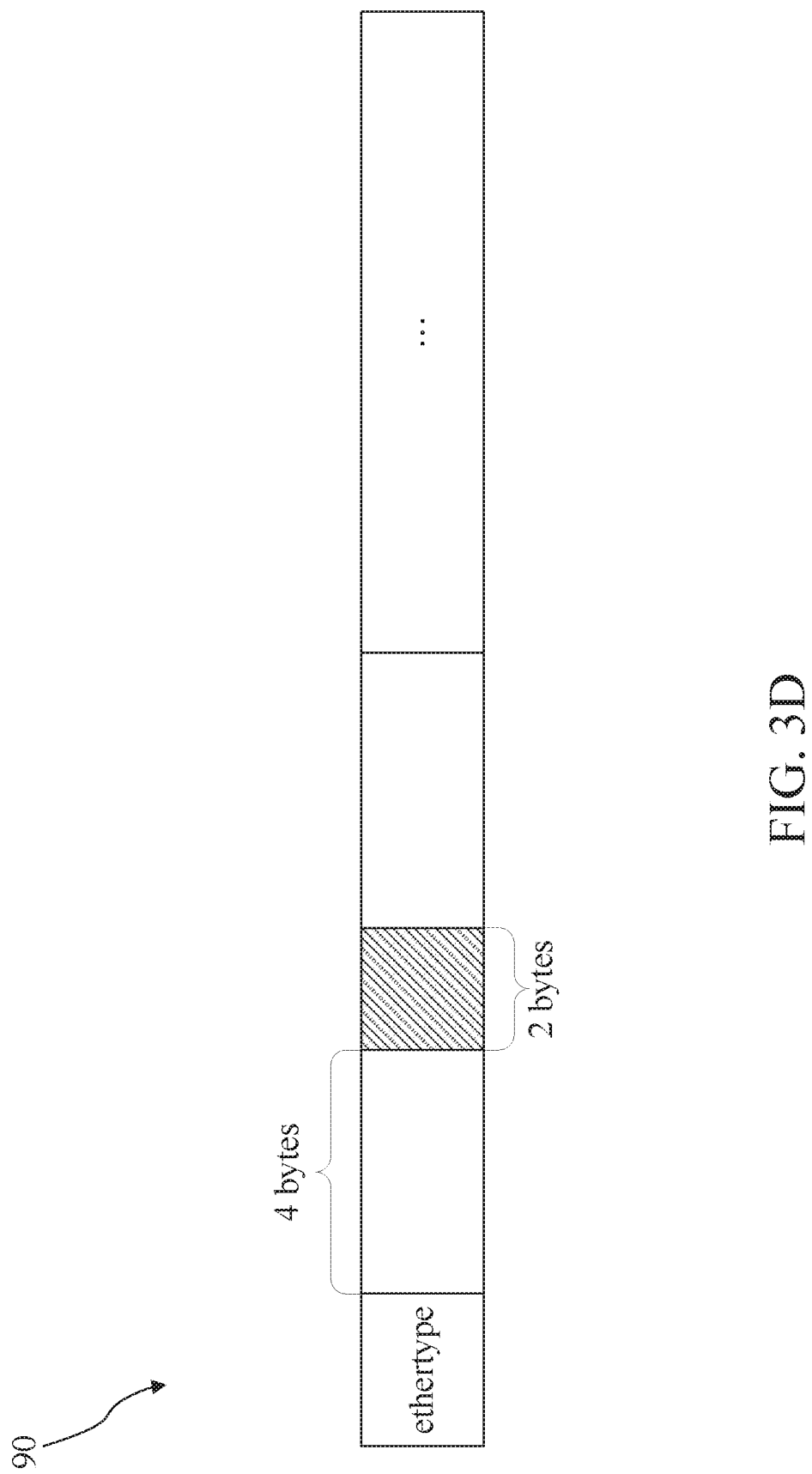

Then, please refer to FIG. 3D, when the processing unit 101 performs operation (4) "IP ID update operation", the corresponding initial address operation parameter is the address after 4 (unit: byte) shifted from the outer layer header. In other words, according to the above-mentioned operation parameter, when the operation (4) "IP ID update operation" is being carried out, the processing unit 101 updates, from the address after 4 bytes shifted from the outer layer header, the content recorded in the IP ID field by the packet index value of the corresponding network transmission interface. It should be noted that in FIG. 3D, the shaded portion of the network packet 90 is the IP ID field with a length of 2 bytes.

Figure 3E:
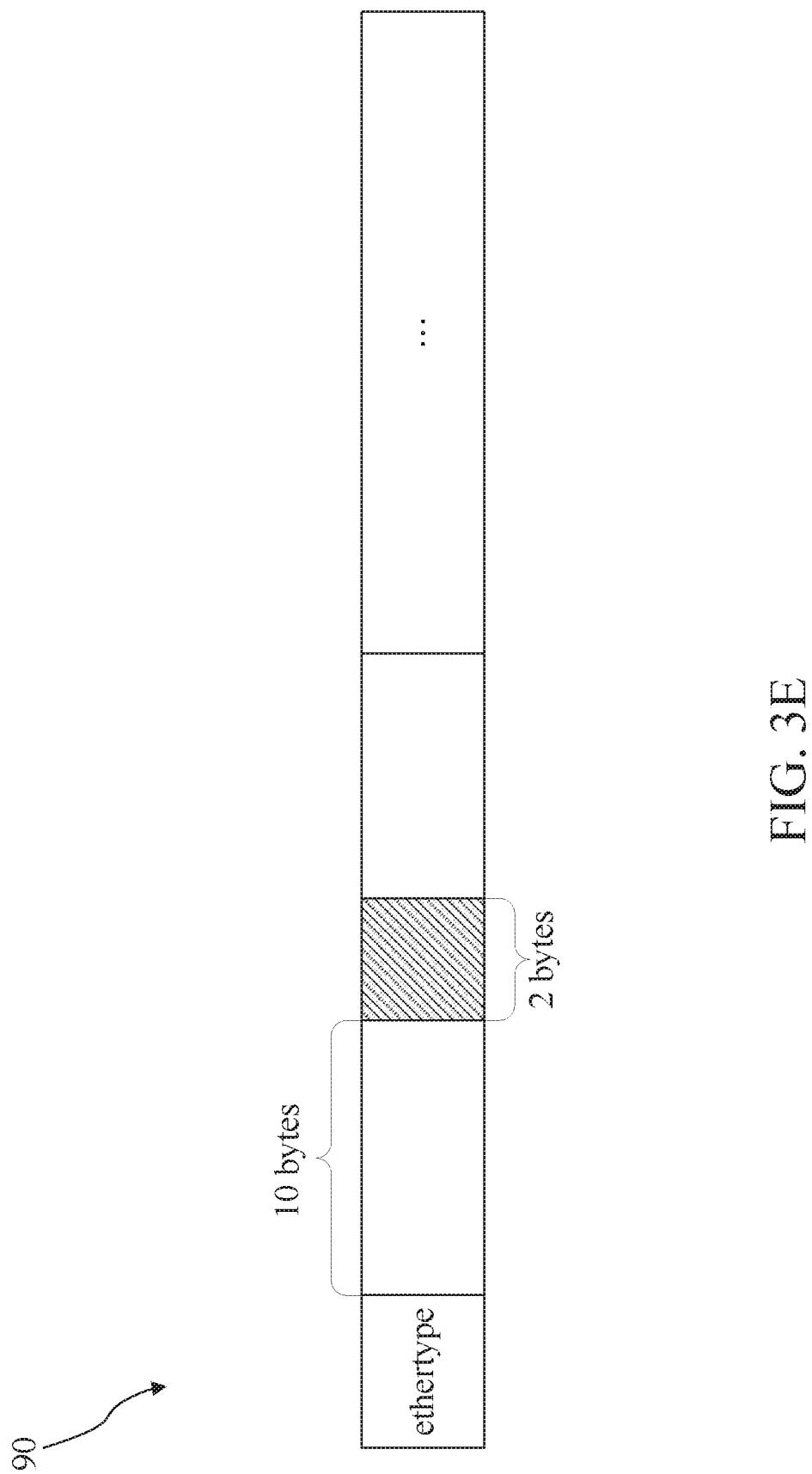

Then, please refer to FIG. 3E, when the processing unit 101 performs operation (5) "L3 check code update operation", the corresponding initial address operation parameter is the address after 10 (unit: byte) shifted from the outer layer header. In other words, according to the above-mentioned operation parameter, when the operation (5) "L3 check code update operation" is being carried out, the processing unit 101 recalculates the L3 check code for the content of the current network packet 90, and uses the calculation results to update the L3 check code field from the address after 10 bytes shifted from the outer layer header. It should be noted that in FIG. 3E, the shaded portion in the network packet 90 is the L3 check code field with a length of 2 bytes.

Figure 3F:
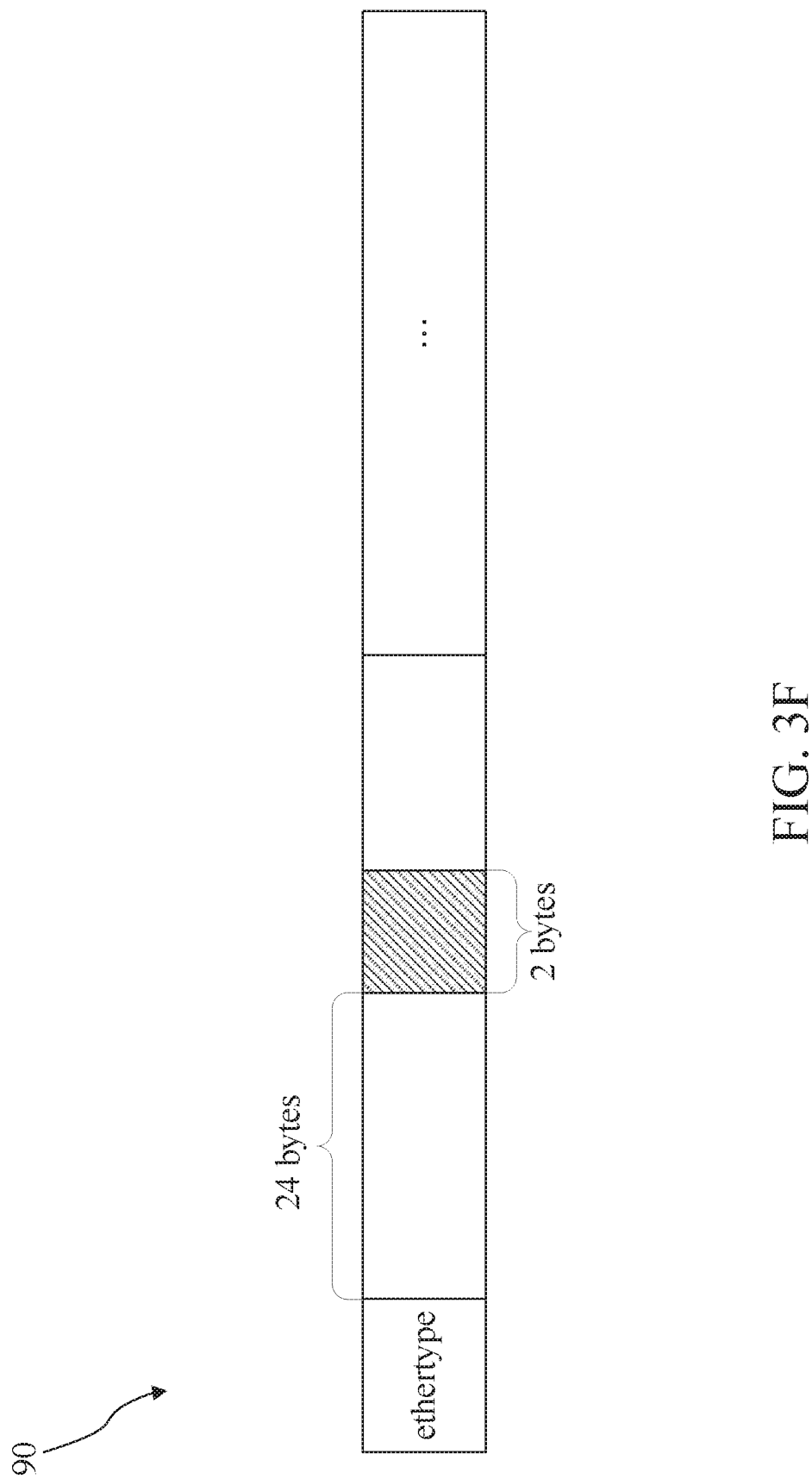

Next, please refer to FIG. 3F, when the processing unit 101 performs operation (6) "packet length update operation", the corresponding initial address operation parameter is the address after 24 (unit: byte) shifted from the outer layer header, and the length operation parameter is 2 (unit: byte). Moreover, this operation further includes the corresponding additional operation parameter of 0 (representing the addition operand) and additional value parameter of 4. In other words, according to the above-mentioned four operation parameters, when the operation (6) "packet length update operation" is being carried out, the processing unit 101 updates 2 bytes data from the address after 24 bytes shifted from the outer layer header (i.e., the shaded portion of the network packet 90 in FIG. 3F). The update involves primarily in adding a value of 4 to the value of the original data. It should be noted that in FIG. 3F, the shaded portion in the network packet 90 is the GRE load length field.

Figure 3G:
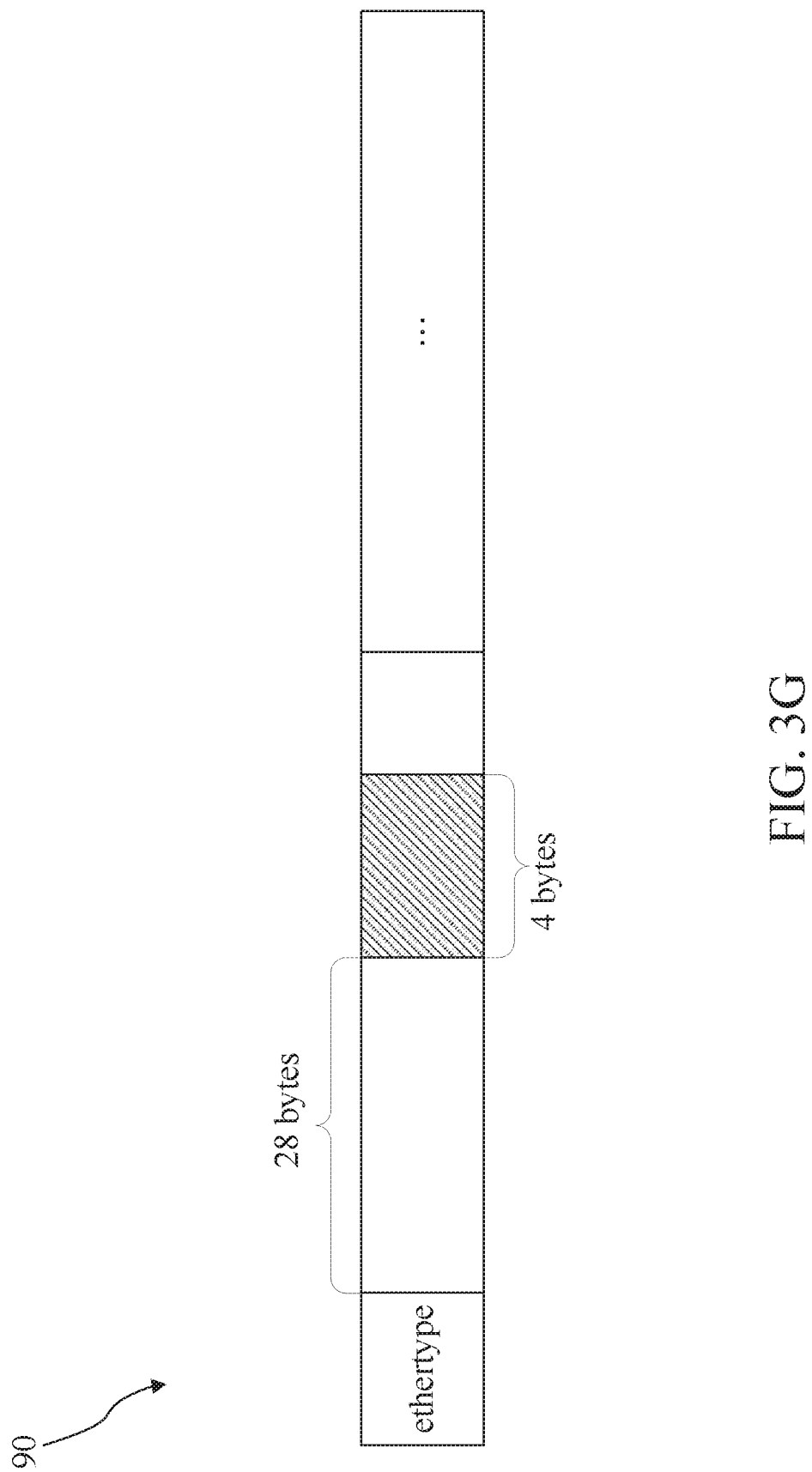

Thereafter, please refer to FIG. 3G, when the processing unit 101 performs operation (7) "GRE data update operation", the corresponding initial address operation parameter is the address after 28 (unit: byte) shifted from the outer layer header. In other words, according to the above-mentioned operation parameter, when the operation (7) "GRE data update operation" is being carried out, the processing unit 101 uses the packet index value corresponding to the network transmission interface to update, from the address after 28 bytes shifted from the outer layer header, the content recorded in the GRE sequence number/acknowledge (ACK) number field. It should be noted that in FIG. 3G, the shaded portion of the network packet 90 is the GRE sequence number/acknowledge number field.

In some embodiments, when the packet type 90T is determined as the L2TP type, the network packet 90 need the following operations for being further processed: insert outer layer header operation, change packet Ethertype operation, the packet length update operation, GRE data or IP ID update operation, L3 check code update operation, and L4 check code update operation. The above-mentioned operations may be recorded in the packet operation list LS in every possible combination.

More specifically, when the packet type 90T of the network packet 90 is the L2TP type, the processing unit 101 retrieves the packet operation list LS, and performs the packet operations recorded in the packet operation list LS in the order of: (1) insert outer layer header operation; (2) change packet Ethertype operation; (3) packet length update operation; (4) GRE data or IP ID update operation; (5) L3 check code update operation; (6) packet length update operation; (7) packet length update operation; and (8) L4 check code update operation. In other words, after retrieving the packet operation list LS, the processing unit 101 carries out the recorded packet operations (1) to (8) sequentially, so as to further process the network packet 90.

In some embodiments, the packet operation list LS records a plurality of operation parameters corresponding to the above-mentioned packet operations, and the processing unit 101 sequentially performs the above-mentioned packet operations (1) to (8) according to a plurality of operation parameters, so as to further process the network packet 90. FIG. 4A to FIG. 4H and accompanying examples are provided hereinbelow to illustrate the process of the above-mentioned packet operations (1) to (8) in connection with the operation parameters in more detail.

For example, based on the L2TP protocol, in addition to the content of the original network packet 90, some L2TP type network packet further includes an P v4 header with a length of 20 bytes, a UDP header with a length of 8 bytes, a L2TP header with a length of 8 bytes and a PPP header with a length of 4 bytes, and hence, an outer layer header with a length of 40 bytes (including the IP v4 header, UDP header, L2TP header and PPP header) should be additionally inserted into the network packet 90.

Figure 4A:
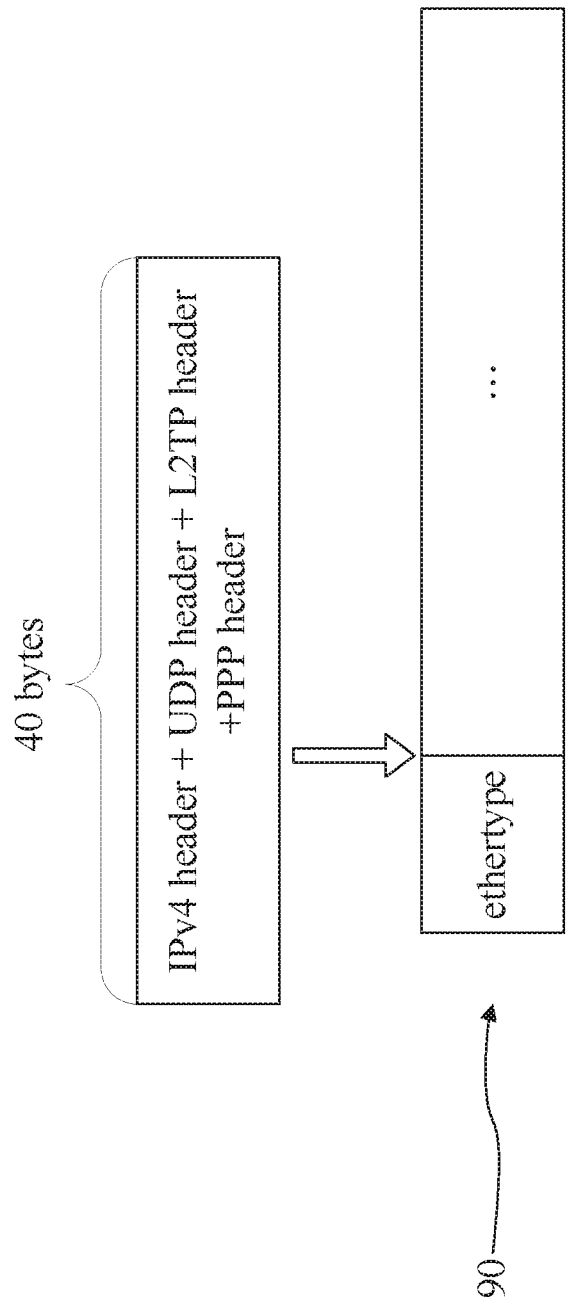
Figure 4B:
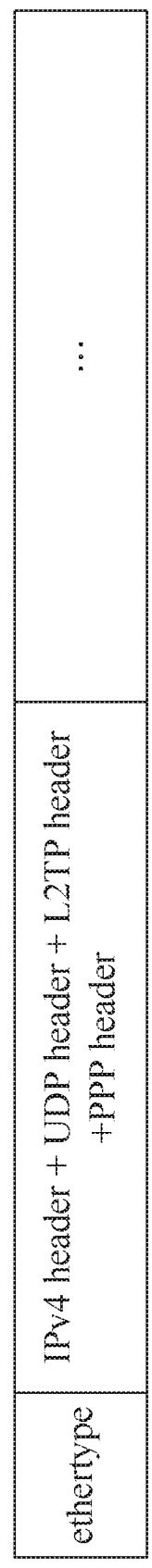

Accordingly, please refer to FIGS. 4A and 4B, when the processing unit 101 performs operation (1) "insert outer layer header operation", the corresponding initial address operation parameter is the address after the Ethertype field of the original network packet 90, and the length operation parameter is 40 (unit: byte). In other words, according to the above-mentioned two operation parameters, when the operation (1) "insert outer layer header operation" is being carried out, the processing unit 101 inserts an outer layer header having a length of 40 bytes after the Ethertype field originally recorded in the network packet 90. Then, the processing unit 101 carries out the operation (2) "change packet Ethertype operation," in which the Ethertype field originally recorded in the network packet 90 is changed into 0x0800 (i.e., IP v4 Ethertype).

Figure 4C:
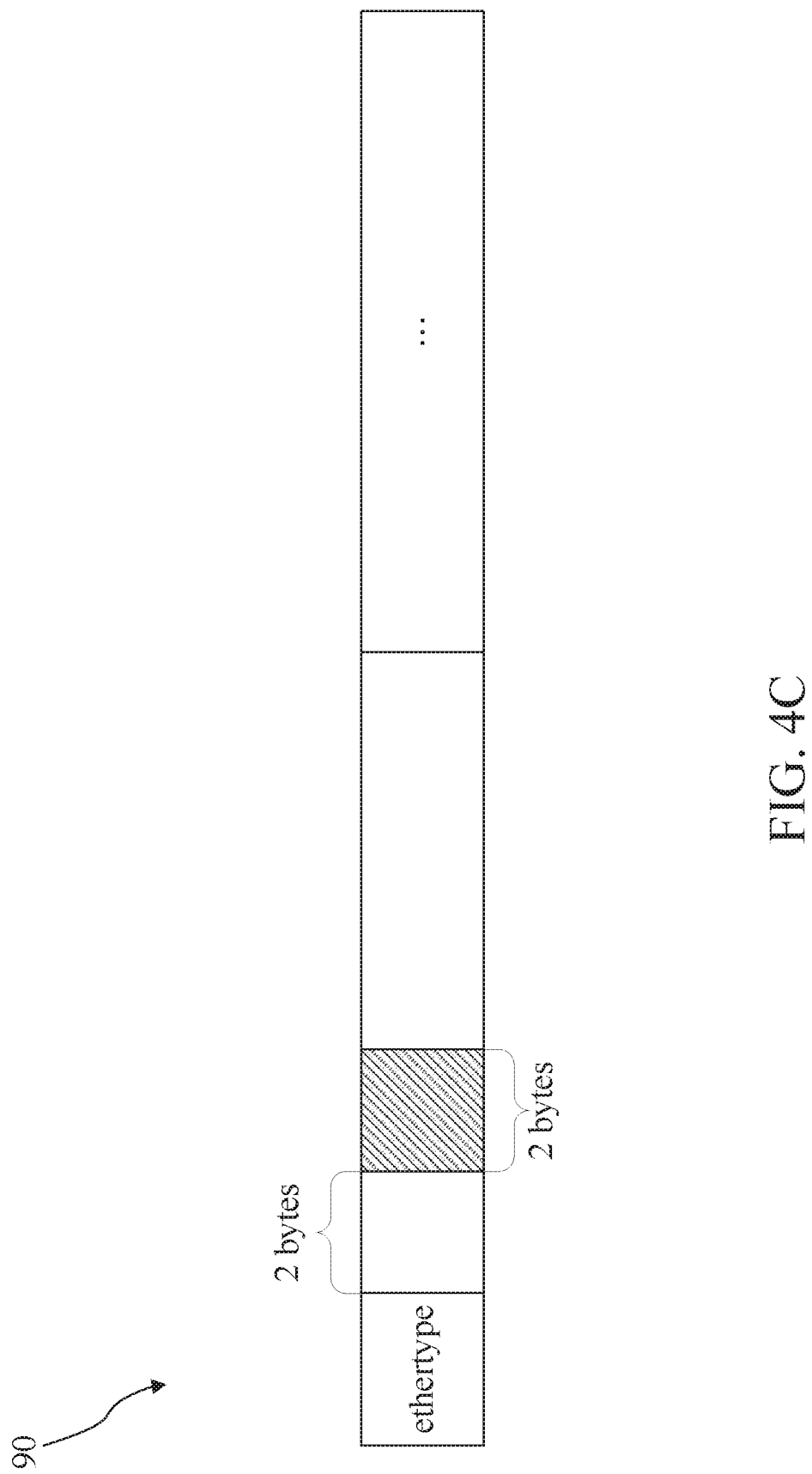

Next, please refer to FIG. 4C, when the processing unit 101 performs operation (3) "packet length update operation", the corresponding initial address operation parameter is the address after 2 (unit: byte) shifted from the outer layer header, and the length of the operation parameter is 2 (unit: byte). Moreover, this operation further includes a corresponding additional operation parameter 0 (representing the addition operand) and additional value parameter of 40. In other words, according to the above-mentioned four operation parameters, when the operation (3) "packet length update operation" is being carried out, the processing unit 101 updates 2 bytes data from the address after 2 bytes shifted from the outer layer header (i.e., the shaded portion of the network packet 90 in FIG. 4C). The update involves primarily in adding a value of 40 to the value of the original data. It should be noted that in FIG. 4C, the shaded portion in the network packet 90 is the total length field.

Figure 4D:
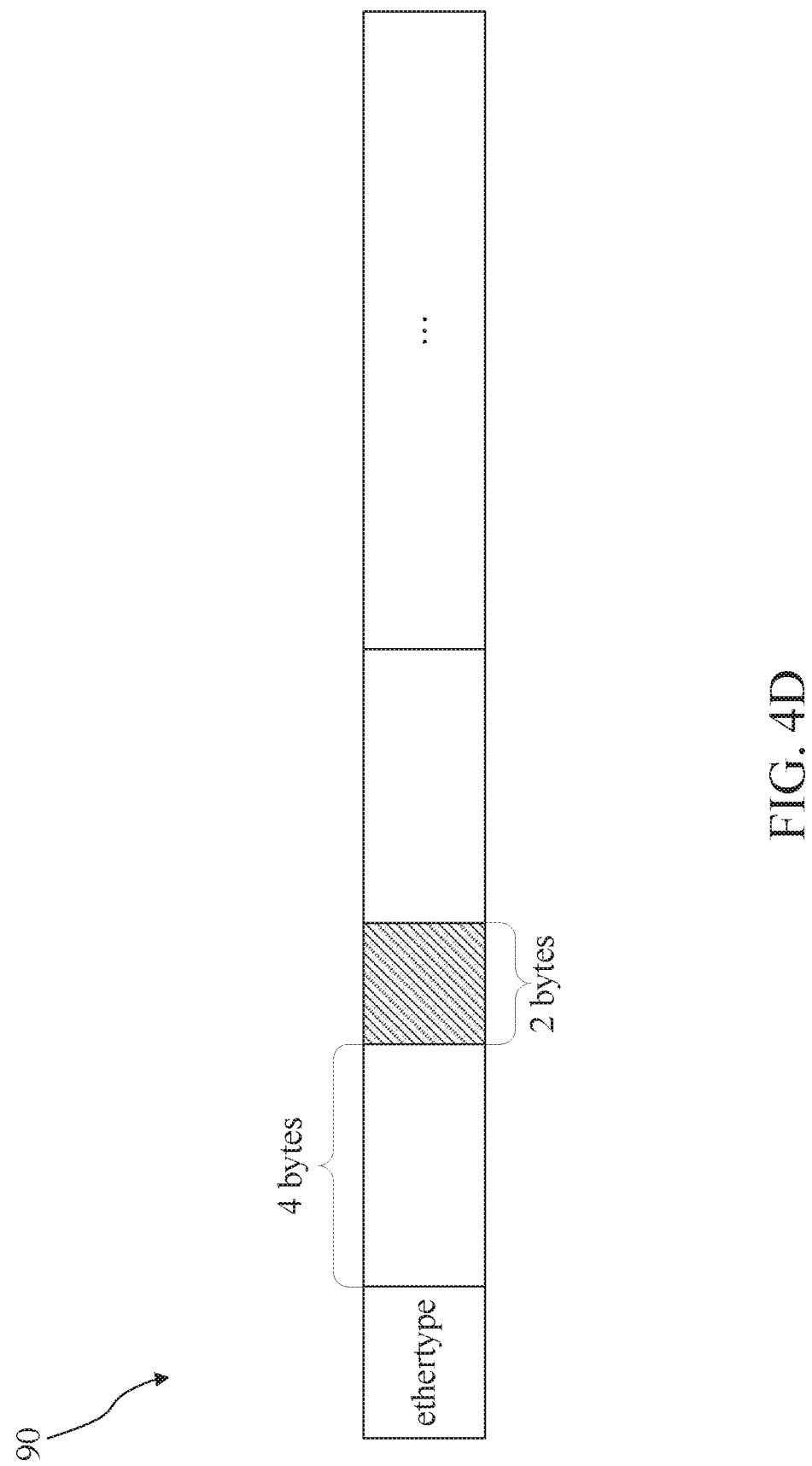

Then, please refer to FIG. 4D, when the processing unit 101 performs operation (4) "IP ID update operation", the corresponding initial address operation parameter is the address after 4 (unit: byte) shifted from the outer layer header. In other words, according to the above-mentioned operation parameter, when the operation (4) "IP ID update operation" is being carried out, the processing unit 101 updates, from the address after 4 bytes shifted from the outer layer header, the content recorded in the IP ID field by the packet index value of the corresponding network transmission interface. It should be noted that in FIG. 4D, the shaded portion of the network packet 90 is the IP ID field with a length of 2 bytes.

Figure 4E:
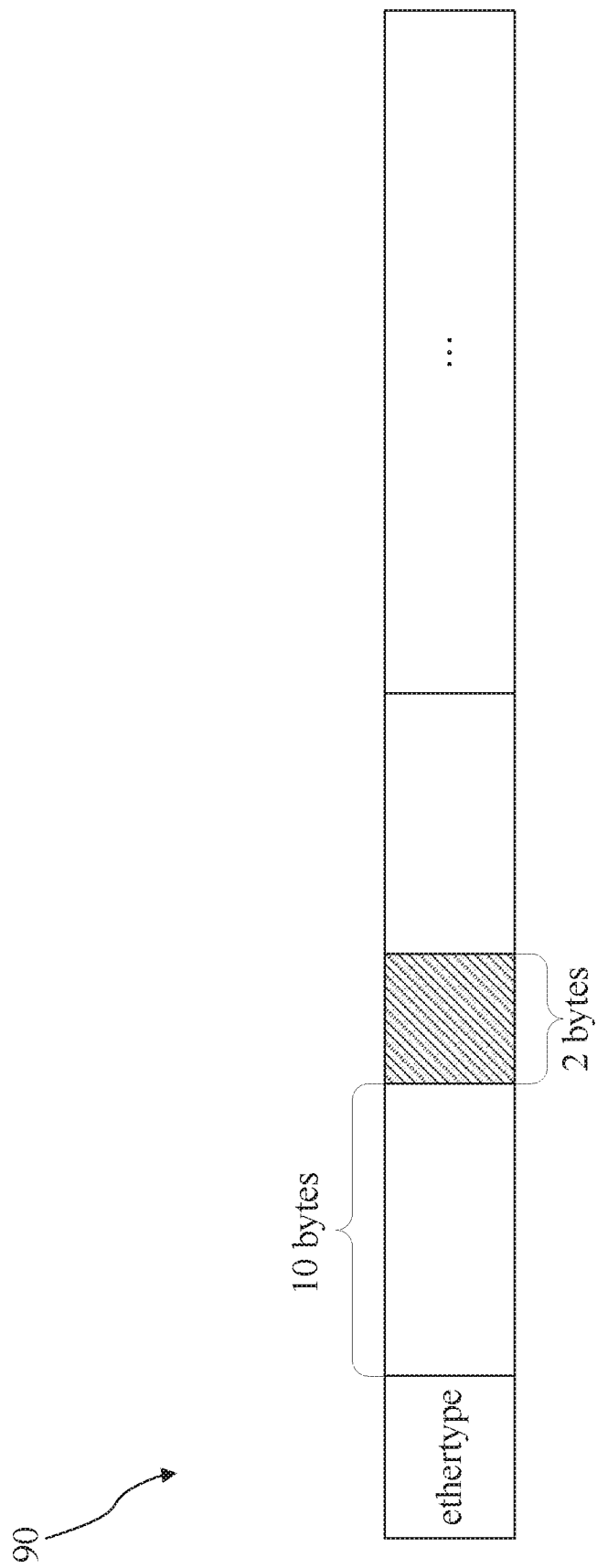

Next, please refer to FIG. 4E, when the processing unit 101 performs operation (5) "L3 check code update operation", the corresponding initial address operation parameter is the address after 10 (unit: byte) shifted from the outer layer header. In other words, according to the above-mentioned operation parameter, when the operation (5) "L3 check code update operation" is being carried out, the processing unit 101 recalculates the L3 check code for the content of the current network packet 90, and uses the calculation results to update the L3 check code field from the address after 10 bytes shifted from the outer layer header. It should be noted that in FIG. 4E, the shaded portion in the network packet 90 is the L3 check code field with a length of 2 bytes.

Figure 4F:
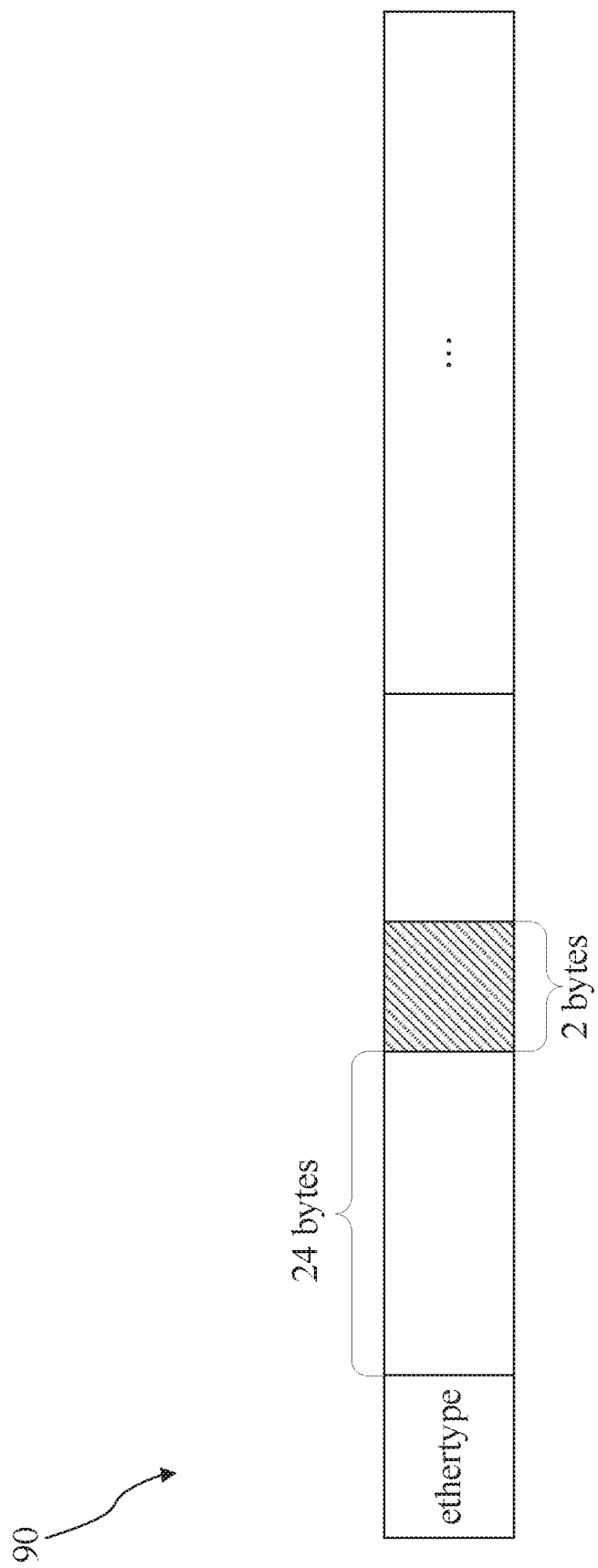

Thereafter, please refer to FIG. 4F, when the processing unit 101 performs operation (6) "packet length update operation", the corresponding initial address operation parameter is the address after 24 (unit: byte) shifted from the outer layer header, and the length operation parameter is 2 (unit: byte). Moreover, this operation further comprises the corresponding additional operation parameter of 0 (representing the addition operand) and additional value parameter of 20. In other words, according to the above-mentioned four operation parameters, when the operation (6) "packet length update operation" is being carried out, the processing unit 101 updates 2 bytes data from the address after 24 bytes shifted from the outer layer header (i.e., the shaded portion of the network packet 90 in FIG. 4F). The update involves primarily in adding a value of 20 to the value of the original data. It should be noted that in FIG. 4F, the shaded portion in the network packet 90 is the UDP header length field.

Figure 4G:
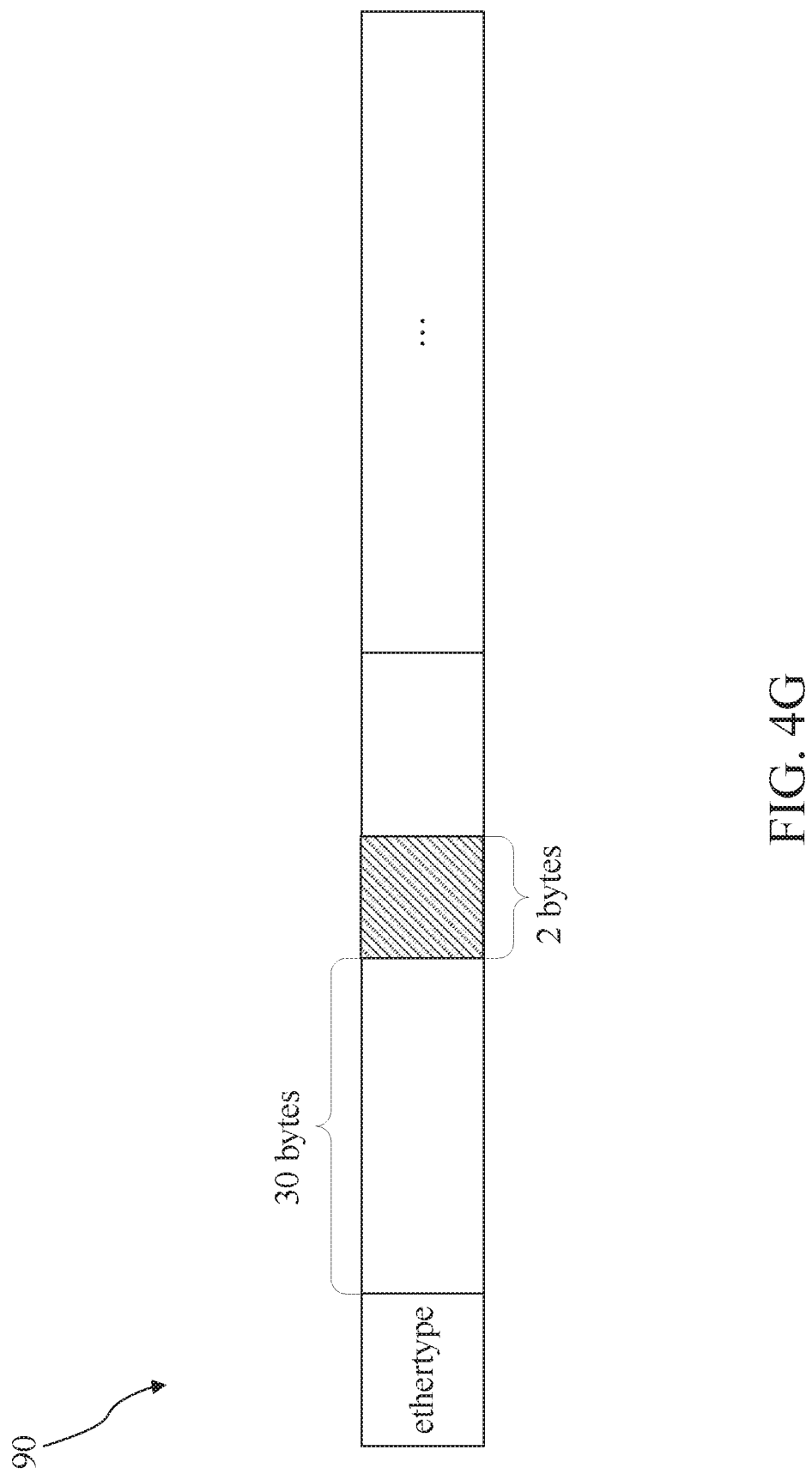

Then, please refer to FIG. 4G, when the processing unit 101 performs operation (7) "packet length update operation", the corresponding initial address operation parameter is the address after 30 (unit: byte) shifted from the outer layer header, and the length operation parameter is 2 (unit: byte). Moreover, this operation further includes the corresponding additional operation parameter of 0 (representing the addition operand) and additional value parameter of 12. In other words, according to the above-mentioned four operation parameters, when the operation (7) "packet length update operation" is being carried out, the processing unit 101 updates 2 bytes data from the address after 30 bytes shifted from the outer layer header (i.e., the shaded portion of the network packet 90 in FIG. 4G). The update involves primarily in adding a value of 12 to the value of the original data. It should be noted that in FIG. 4F, the shaded portion in the network packet 90 is the L2TP header length field.

Next, please refer to FIG. 4H, when the processing unit 101 performs operation (8) "L4 check code update operation", the corresponding initial address operation parameter is the address after 26 (unit: byte) shifted from the outer layer header. In other words, according to the above-mentioned operation parameter, when the operation (8) "L4 check code update operation" is being carried out, the processing unit 101 recalculate the L4 check code for the content of the current network packet 90, and uses the calculation result to update the L4 check code field from the address after 26 bytes shifted from the outer layer header. It should be noted that in FIG. 4H, the shaded portion of the network packet 90 is the L4 check code field, and the length is 2 bytes.

In some embodiments, when the packet type 90T is determined as the DS-Lite type, the network packet 90 needs the following operations for being further processed: insert outer layer header operation, change packet Ethertype operation and packet length update operation. The above-mentioned operations may be recorded in the packet operation list LS in every possible combination.

More specifically, when the packet type 90T of the network packet 90 is the DS-Lite type, the processing unit 101 retrieves the packet operation list LS, and performs the packet operations recorded in the packet operation list LS: (1) insert outer layer header operation; (2) change packet Ethertype operation; and (3) packet length update operation. In other words, after retrieving the packet operation list LS, the processing unit 101 carries out the recorded packet operations (1) to (3) in that order, so as to further process the network packet 90.

Figure 5A:
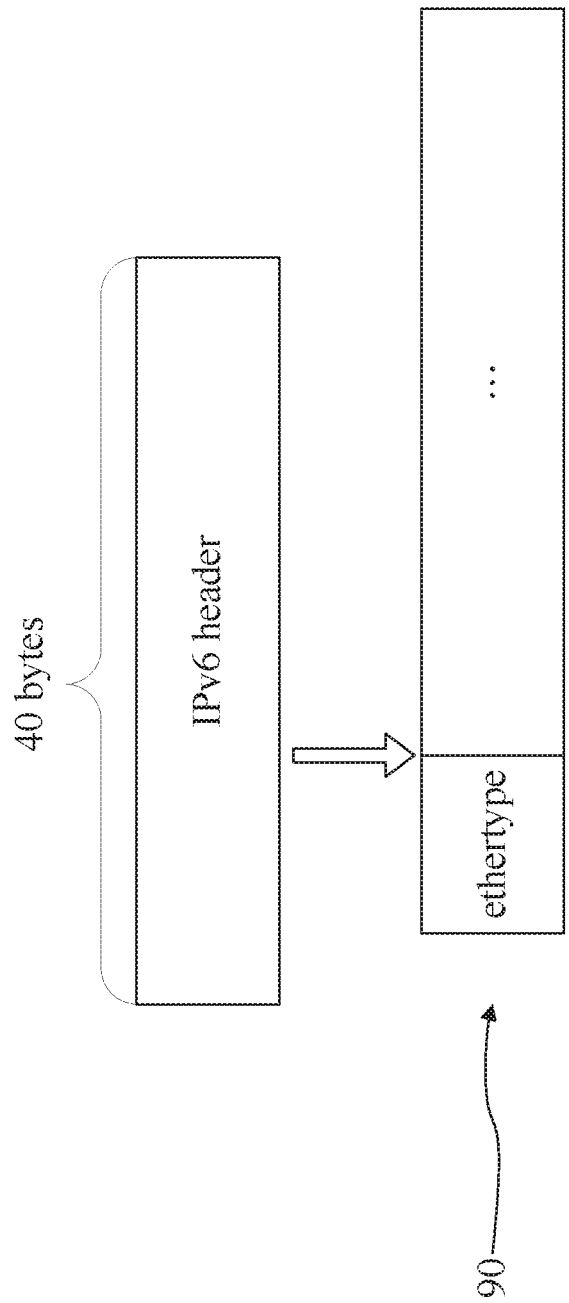
FIGS. 5A to 5C are schematic views of processing the network packet according to some embodiments of the present disclosure.
Figure 5B:
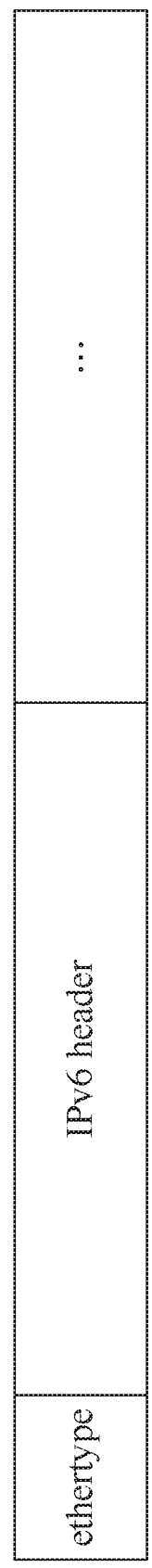
Figure 5C:
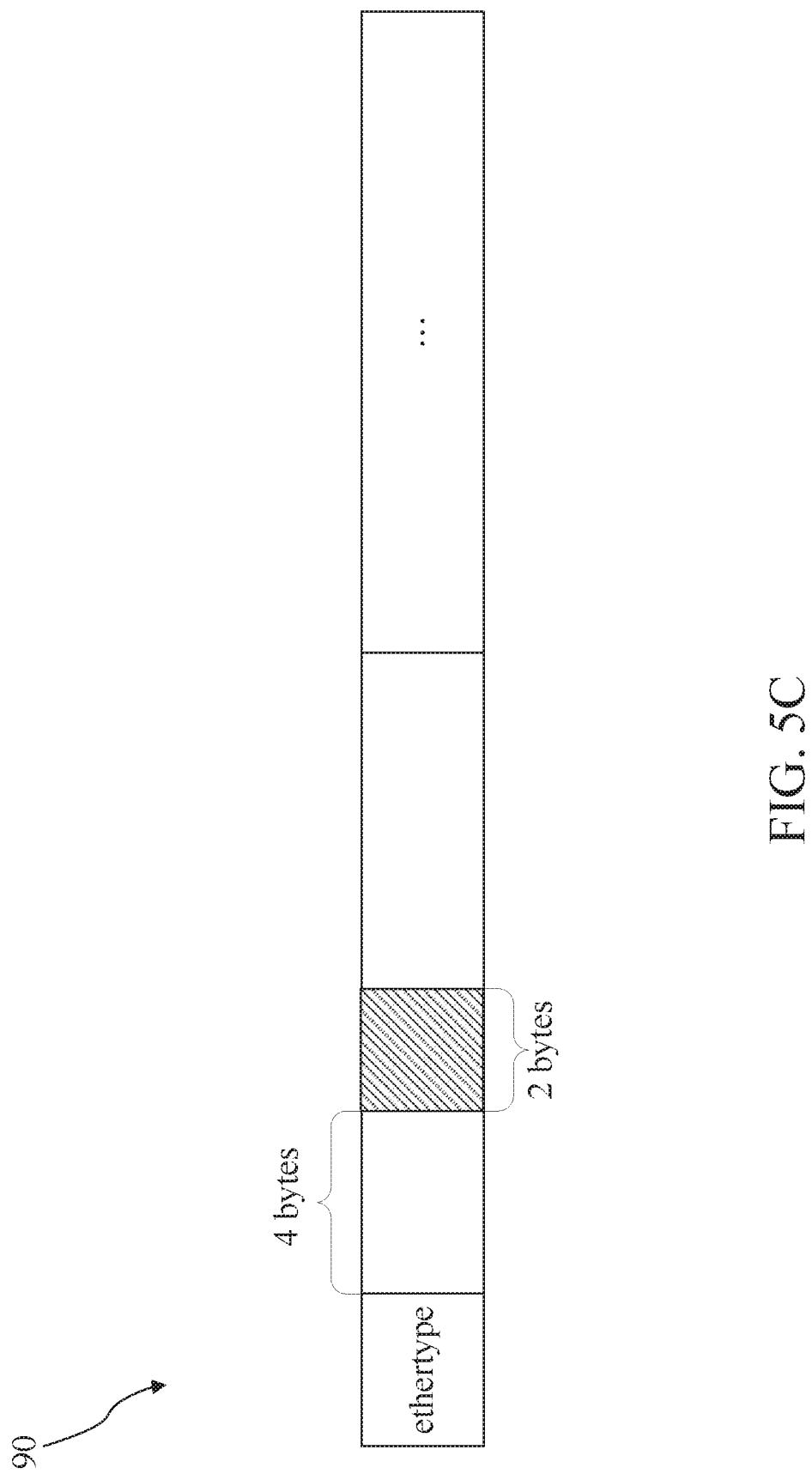

In some embodiments, the packet operation list LS records a plurality of operation parameters corresponding to the above-mentioned packet operations, and the processing unit 101 sequentially performs the above-mentioned packet operations (1) to (3) according to a plurality of operation parameters, so as to further process the network packet 90. FIG. 5A to FIG. 5C and accompanying examples are provided hereinbelow to illustrate the process of the above-mentioned packet operations (1) to (3) in connection with the operation parameters in more detail.

For example, based on the DS-Lite protocol, some DS-Lite network packets further includes an IP v6 header with a length of 40 bytes in addition to the content of the original network packet 90, and hence, an outer layer header with a length of 40 bytes (including the IP v6 header) is additionally inserted into the network packet 90.

Accordingly, please refer to FIGS. 5A and 5B, when the processing unit 101 performs operation (1) "insert outer layer header operation", the corresponding initial address operation parameter is the address after the Ethertype field of the original network packet 90, and a length operation parameter is 40 (unit: byte). In other words, according to the above-mentioned two operation parameters, when the operation (1) "insert outer layer header operation" is being carried out, the processing unit 101 inserts an outer layer header with a length of 40 bytes after the Ethertype field originally recorded in the network packet 90. Then, the processing unit 101 performs operation (2) "change packet Ethertype operation" to change the Ethertype field originally recorded in the network packet 90 into 0x86dd (i.e., the IP v6 Ethertype).

Then, please refer to FIG. 5C, when the processing unit 101 performs operation (3) "packet length update operation", the corresponding initial address operation parameter is the address after 4 (unit: byte) shifted from the outer layer header, and the length operation parameter is 2 (unit: byte). Moreover, this operation further includes a corresponding additional operation parameter 0 (representing the addition operand) and additional value parameter of 40. In other words, according to the above-mentioned four operation parameters, when the operation (3) "packet length update operation" is being carried out, the processing unit 101 updates 2 bytes data from the address after 4 bytes shifted from the outer layer header (i.e., the shaded portion of the network packet 90 in FIG. 5C). The update involves primarily in adding the value of the original data with 40. It should be noted that in FIG. 5C, the shaded portion of the network packet 90 is the total length field.

The above disclosure discusses primarily the processing before the gateway controlling chip 10 finishes the network packet transmission in the uplink IP tunnel. In some embodiments, during the transmission process, the corresponding packet sequence and packet acknowledge number of a portion of the IP tunnel network packets may change, and hence, the gateway controlling chip 10 may use an additional register to store the up-to-date packet sequence number and packet acknowledge number, so that the software and hardware may determine the most current status of the packet transmission and keeps the packet transmission going normally.

Figure 6:
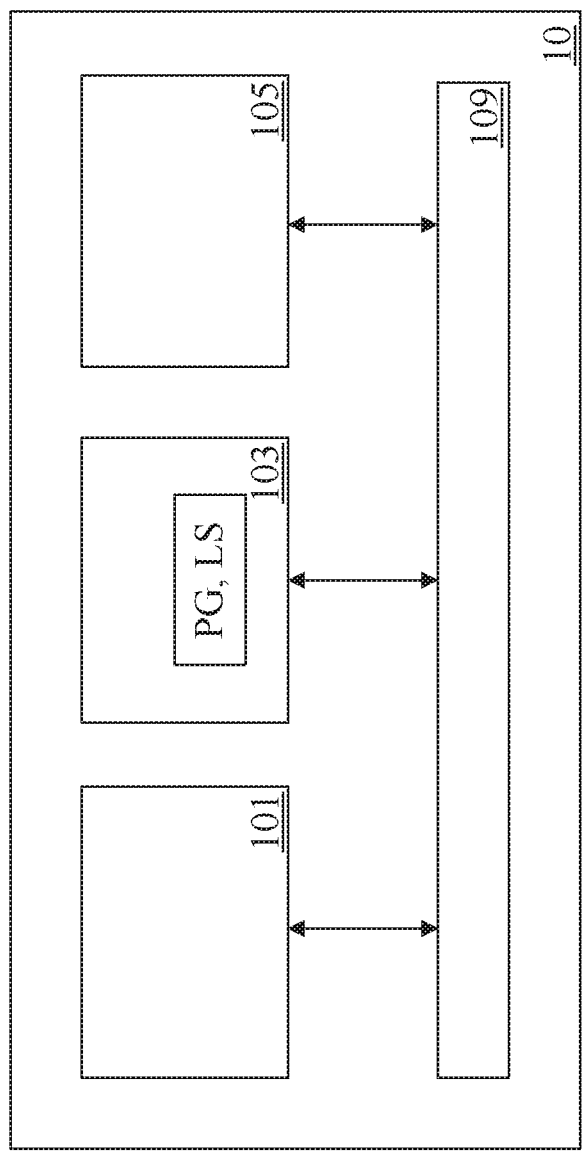
FIG. 6 is a block diagram illustrating a gateway controlling chip according to some embodiments of the present invention.

Please refer to FIG. 6, which is a block diagram illustrating a gateway controlling chip 10 according to some embodiments of the present invention. The gateway controlling chip 10 further includes a register 105. The processing unit 101, the storage unit 103 and the register 105 are electrically coupled by the bus 109. Via the bus 109, the processing unit 101 may execute the program PG stored in the storage unit 103 store. The execution of the program PG may causes the processing unit 101 to perform the function of network packet status update. The relevant network packet status update function is further discussed hereinafter.

In some embodiments, the register 105 stores a GRE sequence number, a GRE acknowledge number and an IP ID which are configured to record the up-to-date status of the transmission of the network packets. Specifically, when the processing unit 101 in the above-mentioned embodiments determines that the packet type 90T of the network packet 90 is the PPTP type, the processing unit 101 updates the GRE sequence number, GRE acknowledge number and IP ID of the network packet 90 by the GRE sequence number, GRE acknowledge number and IP ID stored in the register 105 during a corresponding packet operation.

Then, after the processing unit 101 transmits the network packet 90 to the server end 8 via the transmission interface of the gateway 1, the processing unit 101 updates the GRE sequence number of the register 105 (e.g., adding the GRE sequence number with the value of 1) and updates the IP ID (e.g., adding the IP ID with the value of 1) of the register 105. On the other hand, after the gateway 1 receives a downlink PPTP network packet that the server end 8 transmits to the client end 9, the processor 101 of the gateway controlling chip 10 retrieves said downlink PPTP network packet, and updates the GRE acknowledge number of the register 105 by the GRE sequence number of said downlink PPTP network packet.

In some embodiments, the register 105 stores the IP ID which is configured to record the up-to-date status of transmission of the network packets. Specifically, when the processing unit 101 in the above-mentioned embodiments determines that the packet type 90T of the network packet 90 is the L2TP type, the processing unit 101 updates the IP ID of the network packet 90 by the IP ID stored in the register 105 during the corresponding packet operation. Then, when the processing unit 101 transmits the network packet 90 to the server end 8 via the transmission interface of the gateway 1, the processing unit 101 updates the IP ID of the register 105 (e.g., adding the IP ID with the value of 1).

Figure 7:
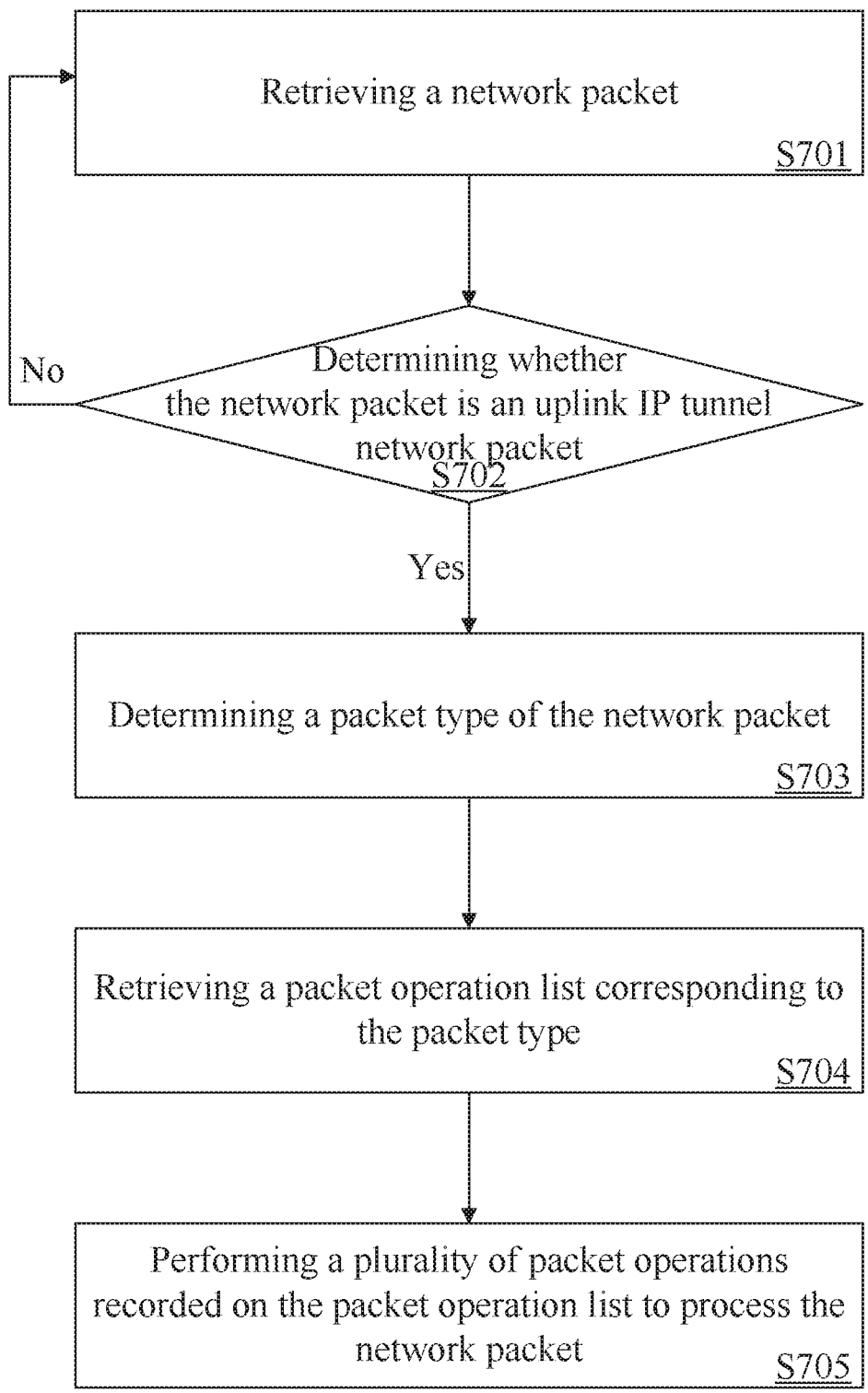
FIG. 7 is a flowchart diagram of a network packet processing method according to some embodiments of the present disclosure.

Some embodiments of the present invention include a network packet processing method, and FIG. 7 is a flow diagram showing the process thereof. The network packet processing method of these embodiments is implemented by a gateway controlling chip (e.g., the gateway controlling chip 10 of the above-mentioned embodiments). The detailed operations of the method are provided below.

First, operation S701 is executed to retrieve a network packet. Then, operation S702 is executed to determine whether the network packet is an uplink IP tunnel network packet. If not, then return to operation S701, in which next network packet is retrieved. If yes, operation step S703 is executed to determine a packet type of the uplink IP tunnel network packet. Then, operation S704 is executed to retrieve a packet operation list corresponding to the packet type. The packet operation list records a plurality of packet operations. Then, operation S705 is executed to perform the packet operation to process the network packet.

Figure 8A:
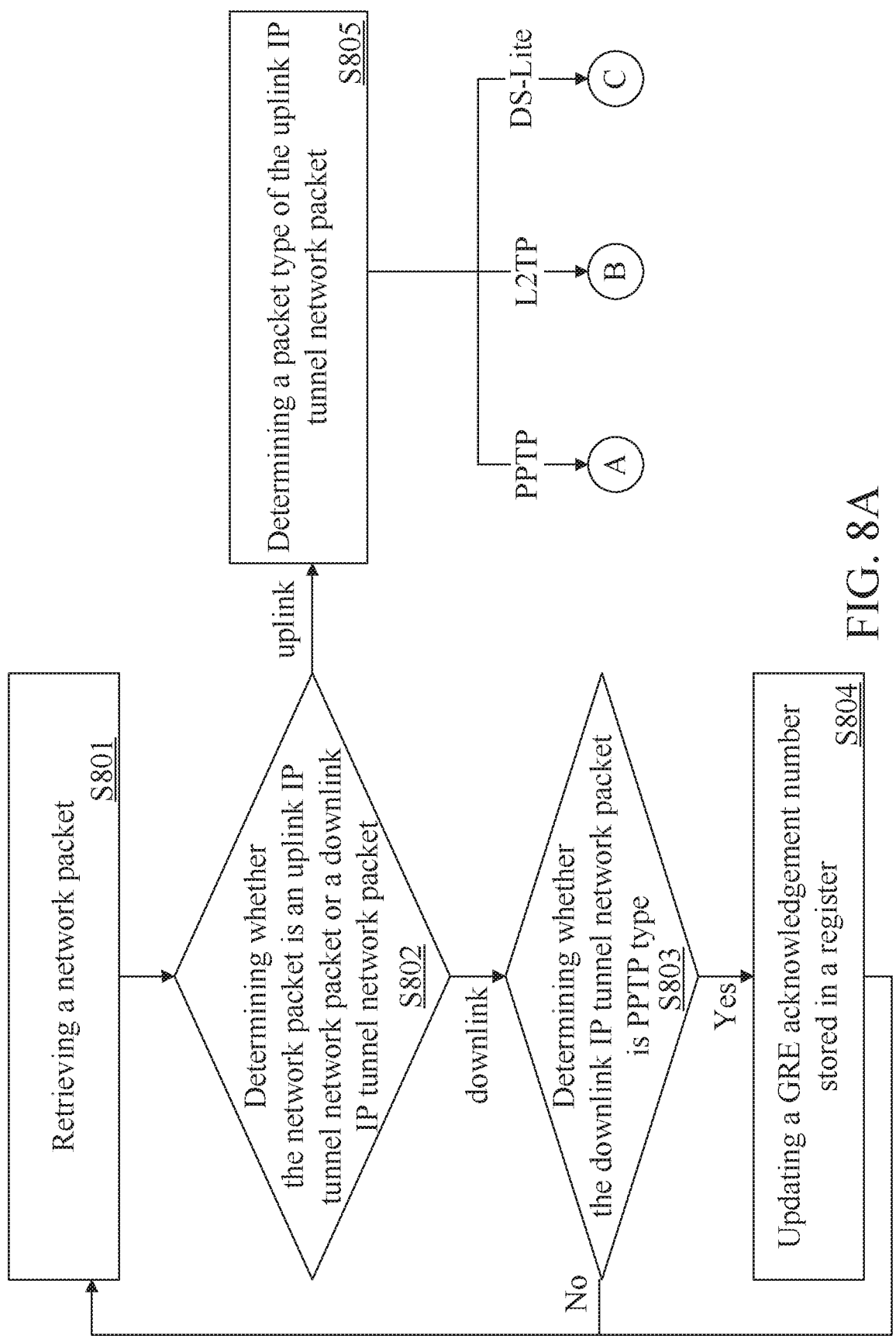
FIGS. 8A to 8B are flowchart diagrams of a network packet processing method according to some embodiments of the present disclosure.
Figure 8B:
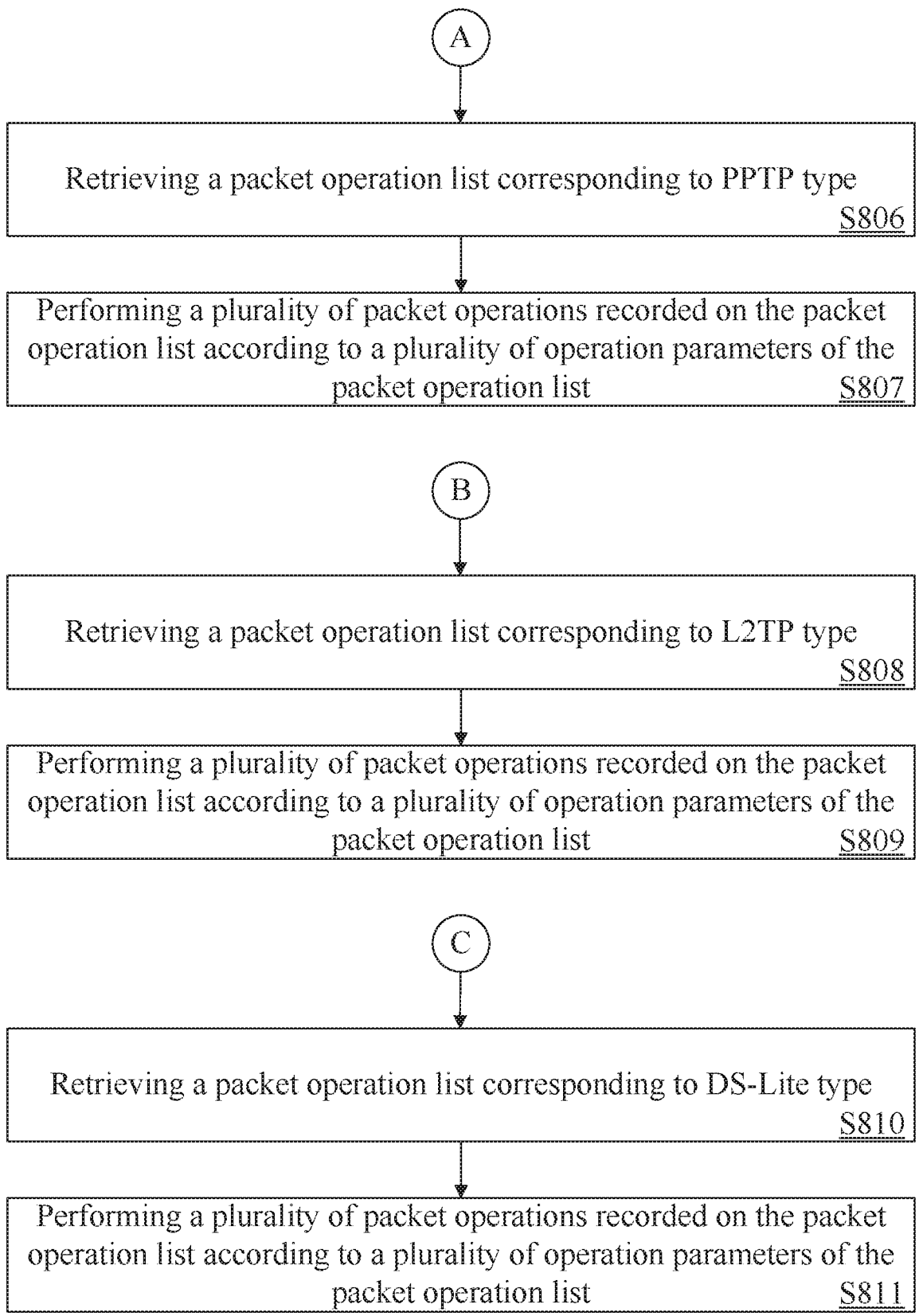

Some embodiments of the present invention include a network packet processing method, and FIG. 8A and FIG. 8B are flow diagrams showing the process thereof. The network packet processing method of these embodiments is implemented by a gateway controlling chip (e.g., the gateway controlling chip 10 of the above-mentioned embodiments). The detailed operations of the method are provided below.

First, operation S801 is executed to retrieve a network packet. Then, operation S802 is executed to determine whether the network packet is an uplink IP tunnel network packet or a downlink IP tunnel network packet. In this embodiment, a packet type of the IP tunnel network packet is a PPTP type, L2TP type or DS-Lite type. If the network packet is a downlink P tunnel network packet, operation S803 is executed to determine whether the downlink IP tunnel network packet is the PPTP type. If yes, then operation S804 is executed to update a GRE acknowledge number stored in a register, and then operation S801 is executed to retrieve next network packet. If not, then operation S801 is executed to retrieve next network packet.

On the other hand, when the network packet is determined as an uplink IP tunnel network packet in operation S802, operation S805 is executed to determine a packet type of the uplink IP tunnel network packet. If the packet type of the uplink IP tunnel network packet is PPTP, then operation S806 is executed to retrieve a packet operation list corresponding to the PPTP type. Thereafter, operation S807 is executed to perform a plurality of packet operations of the packet operation list according to a plurality of operation parameters of the packet operation list, so as to process the network packet.

If the packet type of the uplink IP tunnel network packet is L2TP, operation S808 is executed to retrieve a packet operation list corresponding to the L2TP type. Thereafter, operation S809 is executed to perform a plurality of packet operations of the packet operation list according to a plurality of operation parameters of the packet operation list, so as to process the network packet. If the packet type of the uplink IP tunnel network packet is DS-Lite, operation S810 to retrieve a packet operation list corresponding to the DS-Lite type. Thereafter, operation S811 is executed to perform a plurality of packet operations of the packet operation list according to a plurality of operation parameters of the packet operation list, so as to process the network packet.

It should be noted that the details of the operation S807 include the packet operations (1) to (7) of the above-mentioned embodiments executed by the gateway controlling chip 10 for the PPTP type network packet. The details of the operation S809 include the packet operations (1) to (8) of the above-mentioned embodiments executed by the gateway controlling chip 10 for the L2TP type network packet. The details of the operation S811 include the packet operation (1) to (3) of the above-mentioned embodiments executed by the gateway controlling chip 10 for the DS-Lite type network packet. Accordingly, detailed description regarding the same is omitted herein for the sake of brevity.

Moreover, after performing the above-mentioned operations, the processing of the network packet is complete, and hence, an additional operation of transmitting the network packet may be perform, and an additional operation to update the content of the register may be performed depending on the technology of the gateway controlling chip 10 according to the above-mentioned embodiments, so that the software and hardware may determine the up-to-date status of the network packet transmission, and keeps the packet transmission going normally.

The scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A network packet processing method for use in a gateway controlling chip, comprising:
    retrieving a network packet;
    determining that the network packet is an uplink IP tunnel network packet;
    determining a packet type of the uplink IP tunnel network packet, wherein the packet type comprises a Point to Point Tunneling Protocol (PPTP) type, a Layer 2 Tunneling Protocol (L2TP) type or a Dual-Stack Lite (DS-Lite) type;
    after determining the packet type of the uplink IP tunnel network packet, retrieving a packet operation list corresponding to the packet type, wherein the packet operation list records a plurality of packet operations and a plurality of operation parameters corresponding to the plurality of packet operations, wherein the plurality of packet operations comprise an insert outer layer header operation, a change packet Ethertype operation, a packet length update operation, a Generic Routing Encapsulation (GRE) data or IP identification (IP ID) update operation, a Layer 3 (L3) check code update operation, a Layer 4(L4) check code update operation, or a combination thereof; and
    performing the plurality of packet operations to process the network packet according to the plurality of operation parameters.

2. The network packet processing method of claim 1, wherein the packet type is the PPTP type, and the plurality of packet operations comprise the insert outer layer header operation, the change packet Ethertype operation, the packet length update operation, the GRE data or IP ID update operation, and the L3 check code update operation.

3. The network packet processing method of claim 1, wherein the packet type is the L2TP type, and the plurality of packet operations comprise the insert outer layer header operation, the change packet Ethertype operation, the packet length update operation, the GRE data or IP ID update operation, the L3 check code update operation, and the L4 check code update operation.

4. The network packet processing method of claim 1, wherein the packet type is the DS-Lite type, and the plurality of packet operations comprise the insert outer layer header operation, the change packet Ethertype operation, and the packet length update operation.

5. The network packet processing method of claim 1, wherein the packet type is the PPTP type, and the network packet processing method further comprises:
    updating a Generic Routing Encapsulation (GRE) sequence number of the uplink IP tunnel network packet by a GRE sequence number of a register;
    updating a GRE acknowledge number of the uplink IP tunnel network packet by a GRE acknowledge number of the register; and
    updating an IP identification (IP ID) of the uplink IP tunnel network packet by an IP ID of the register.

6. The network packet processing method of claim 5, further comprising:
    transmitting the network packet;
    updating the GRE sequence number of the register; and
    updating the IP ID of the register.

7. The network packet processing method of claim 5, further comprising:
    receiving a downlink PPTP network packet; and
    updating the GRE acknowledge number of the register.

8. The network packet processing method of claim 1, wherein the packet type is the L2TP type, and the network packet processing method further comprises:
    updating an IP ID of the uplink IP tunnel network packet by an IP identification (IP ID) of a register.

9. The network packet processing method of claim 8, further comprising:
    transmitting the network packet; and
    updating the IP ID of the register.

10. A gateway controlling chip, comprising:
a processing unit;
a storage unit, configured to store a program, wherein the program, upon execution, causes the processing unit to:
retrieve an network packet;
determine that the network packet is an uplink IP tunnel network packet;
determine a packet type of the uplink IP tunnel network packet, wherein the packet type comprises a Point to Point Tunneling Protocol (PPTP) type, a Layer 2 Tunneling Protocol (L2TP) type or a Dual-Stack Lite (DS-Lite) type;
after determining the packet type of the uplink IP tunnel network packet, retrieve a packet operation list corresponding to the packet type, wherein the packet operation list records a plurality of packet operations and a plurality of operation parameters corresponding to the plurality of packet operations, wherein the plurality of packet operations comprise an insert outer layer header operation, a change packet Ethertype operation, a packet length update operation, a Generic Routing Encapsulation (GRE) data or IP identification (IP ID) update operation, a Layer 3 (L3) check code update operation, a Layer 4 (L4) check code update operation, or a combination thereof; and
perform the plurality of packet operations to process the network packet according to the plurality of operation parameters.

11. The gateway controlling chip of claim 10, wherein the packet type is a Layer 2 Tunneling Protocol (L2TP) type, and the plurality of packet operations comprise an insert outer layer header operation, a change packet Ethertype operation, a packet length update operation, a GRE data or IP ID update operation, a Layer 3 (L3) check code update operation, and a Layer 4 (L4) check code update operation.

12. The gateway controlling chip of claim 10, wherein the packet type is a Dual-Stack Lite (DS-Lite) type, and the plurality of packet operations comprise an insert outer layer header operation, a change packet Ethertype operation, and a packet length update operation.

13. The gateway controlling chip of claim 10, further comprising:
a register, configured to store an IP ID;
wherein the packet type is an L2TP type, and the program, upon execution, further causes the processing unit to:
update an IP ID of the uplink IP tunnel network packet by the IP ID of the register;
transmit the network packet; and
update the IP ID of the register.

14. A gateway controlling chip, comprising:
a processing unit;
a register, configured to store a Generic Routing Encapsulation (GRE) sequence number, a GRE acknowledge number and an IP ID;
a storage unit, configured to store a program, wherein the program, upon execution, causes the processing unit to:
retrieve an network packet;
determine that the network packet is an uplink IP tunnel network packet;
determine a packet type of the uplink IP tunnel network packet;
retrieve a packet operation list corresponding to the packet type, wherein the packet operation list records a plurality of packet operations; and
perform the plurality of packet operations to process the network packet;
wherein when the packet type is a PPTP type, and the program, upon execution, causes the processing unit to:
update a GRE sequence number of the uplink IP tunnel network packet by the GRE sequence number of the register;
update a GRE acknowledge number of the uplink IP tunnel network packet by the GRE acknowledge number of the register; and
update an IP ID of the uplink IP tunnel network packet by the IP ID of the register.

15. The gateway controlling chip of claim 14, wherein the program, upon execution, further causes the processing unit to:
transmit the network packet;
update the GRE sequence number of the register; and
update the IP ID of the register.

16. The gateway controlling chip of claim 14, further comprising:
receiving a downlink PPTP network packet; and
update the GRE acknowledge number of the register.

* * * * *